(12) United States Patent
Huang et al.

(10) Patent No.: US 12,445,245 B2
(45) Date of Patent: Oct. 14, 2025

(54) MODE DETERMINATION FOR ORBITAL ANGULAR MOMENTUM COMMUNICATION SYSTEM

(71) Applicant: QUALCOMM Incorporated, San Diego, CA (US)

(72) Inventors: Min Huang, Beijing (CN); Yu Zhang, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 456 days.

(21) Appl. No.: 17/997,257

(22) PCT Filed: Jul. 1, 2021

(86) PCT No.: PCT/CN2021/103982
§ 371 (c)(1),
(2) Date: Oct. 27, 2022

(87) PCT Pub. No.: WO2022/002195
PCT Pub. Date: Jan. 6, 2022

(65) Prior Publication Data
US 2023/0171056 A1 Jun. 1, 2023

(30) Foreign Application Priority Data

Jul. 2, 2020 (WO) ................ PCT/CN2020/099859

(51) Int. Cl.
*H04W 4/00* (2018.01)
*H04L 5/00* (2006.01)
*H04W 24/02* (2009.01)

(52) U.S. Cl.
CPC .......... *H04L 5/0048* (2013.01); *H04W 24/02* (2013.01)

(58) Field of Classification Search
CPC ... H04B 7/0868; H04B 7/0452; H04W 72/02; H04W 48/18; H04W 72/23;
(Continued)

(56) References Cited

U.S. PATENT DOCUMENTS 10,581,522 B1   3/2020  Innes et al.
11,395,168 B2   7/2022  Zhang et al.
(Continued)

FOREIGN PATENT DOCUMENTS

CN   106230502 A   12/2016
CN   111133697 A    5/2020
(Continued)

OTHER PUBLICATIONS

International Search Report and Written Opinion—PCT/CN2021/103982—ISA/EPO—Oct. 9, 2021.
(Continued)

*Primary Examiner* — Phuoc H Doan
(74) *Attorney, Agent, or Firm* — Harrity & Harrity, LLP / Qualcomm

(57) ABSTRACT

Various aspects of the present disclosure generally relate to wireless communication. In some aspects, a transmitter may receive, from a receiver associated with an orbital angular momentum (OAM) multiplexing based communication, feedback; determine a selected OAM mode for communication with the receiver based at least in part on the feedback; and transmit the OAM multiplexing based communication to the receiver based at least in part on the selected OAM mode. Numerous other aspects are provided.

30 Claims, 8 Drawing Sheets

(58) Field of Classification Search
CPC .................. H04W 72/1268; H04W 72/21; H04L 1/1822; H04L 47/56; H04L 1/1861
See application file for complete search history.

(56) References Cited

U.S. PATENT DOCUMENTS

2017/0353241 A1   12/2017  Fazal et al.
2020/0127729 A1*  4/2020  Klemes ............... H04L 27/2665

FOREIGN PATENT DOCUMENTS

| | | |
|---|---|---|
| CN | 111133698 A | 5/2020 |
| EP | 4170917 A1 | 4/2023 |
| JP | 2017153018 A | 8/2017 |
| JP | 6513590 B2 | 5/2019 |
| JP | 2019083475 A | 5/2019 |
| WO | WO-2016022309 A1 | 2/2016 |
| WO | WO-2016164146 A2 | 10/2016 |
| WO | WO-2018125084 A1 | 7/2018 |
| WO | WO-2019059406 A1 | 3/2019 |

OTHER PUBLICATIONS

International Search Report and Written Opinion—PCT/CN2020/099859—ISA/EPO—Mar. 25, 2021.

Yang Y., et al., "Mode Modulation for Wireless Communications with a Twist", IEEE Transactions on Vehicular Technology, Nov. 30, 2018 (Nov. 30, 2018), pp. 1-12, No. 11, vol. 67, Sections I-IV.

Supplementary European Search Report—EP21834171—Search Authority—Munich—Jun. 26, 2024.

* cited by examiner

MODE DETERMINATION FOR ORBITAL ANGULAR MOMENTUM COMMUNICATION SYSTEM

CROSS-REFERENCE TO RELATED APPLICATIONS

This Patent Application is a 371 national stage of PCT Application No. PCT/CN2021/103982 filed on Jul. 1, 2021, entitled "MODE DETERMINATION FOR ORBITAL ANGULAR MOMENTUM COMMUNICATION SYSTEM," which claims priority to PCT Patent Application No. PCT/CN2020/099859, filed on Jul. 2, 2020, entitled "MODE DETERMINATION FOR ORBITAL ANGULAR MOMENTUM COMMUNICATION SYSTEM," and assigned to the assignee hereof. The disclosure of the prior Applications are considered part of and is incorporated by reference into this Patent Application.

FIELD OF THE DISCLOSURE

Aspects of the present disclosure generally relate to wireless communication and to techniques and apparatuses for mode determination for an orbital angular momentum (OAM) communication system.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. "Downlink" (or "forward link") refers to the communication link from the BS to the UE, and "uplink" (or "reverse link") refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a transmitter includes: receiving, from a receiver associated with an orbital angular momentum (OAM) multiplexing based communication, feedback; determining a selected OAM mode for communication with the receiver based at least in part on the feedback; and transmitting the OAM multiplexing based communication to the receiver based at least in part on the selected OAM mode.

In some aspects, a method of wireless communication performed by a receiver includes: determining feedback associated with an OAM multiplexing based communication; and transmitting the feedback to a transmitter of the OAM multiplexing based communication.

In some aspects, a transmitter for wireless communication includes: a memory; and one or more processors coupled to the memory, the memory and the one or more processors configured to: receive, from a receiver associated with an OAM multiplexing based communication, feedback; determine a selected OAM mode for communication with the receiver based at least in part on the feedback; and transmit the OAM multiplexing based communication to the receiver based at least in part on the selected OAM mode.

In some aspects, a receiver for wireless communication includes: a memory; and one or more processors coupled to the memory, the memory and the one or more processors configured to: determine feedback associated with an OAM multiplexing based communication; and transmit the feedback to a transmitter of the OAM multiplexing based communication.

In some aspects, a non-transitory computer-readable medium storing one or more instructions for wireless communication includes: one or more instructions that, when executed by one or more processors of a transmitter, cause the one or more processors to: receive, from a receiver associated with an OAM multiplexing based communication, feedback; determine a selected OAM mode for communication with the receiver based at least in part on the feedback; and transmit the OAM multiplexing based communication to the receiver based at least in part on the selected OAM mode.

In some aspects, a non-transitory computer-readable medium storing one or more instructions for wireless communication includes: one or more instructions that, when executed by one or more processors of a receiver, cause the one or more processors to: determine feedback associated with an OAM multiplexing based communication; and transmit the feedback to a transmitter of the OAM multiplexing based communication.

In some aspects, an apparatus for wireless communication includes: means for receiving, from a receiver associated with an OAM multiplexing based communication, feedback; means for determining a selected OAM mode for communication with the receiver based at least in part on the feedback; and means for transmitting the OAM multiplexing based communication to the receiver based at least in part on the selected OAM mode.

In some aspects, an apparatus for wireless communication includes: means for determining feedback associated with an OAM multiplexing based communication; and means for transmitting the feedback to a transmitter of the OAM multiplexing based communication.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, or artificial intelligence-enabled devices). Aspects may be implemented in chip-level components, modular components, non-modular components, non-chip-level components, device-level components, or system-level components. Devices incorporating described aspects and features may include additional components and features for implementation and practice of claimed and described aspects. For example, transmission and reception of wireless signals may include a number of components for analog and digital purposes (e.g., hardware components including antennas, radio frequency (RF) chains, power amplifiers, modulators, buffers, processors, interleavers, adders, or summers). It is intended that aspects described herein may be practiced in a wide variety of devices, components, systems, distributed arrangements, or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
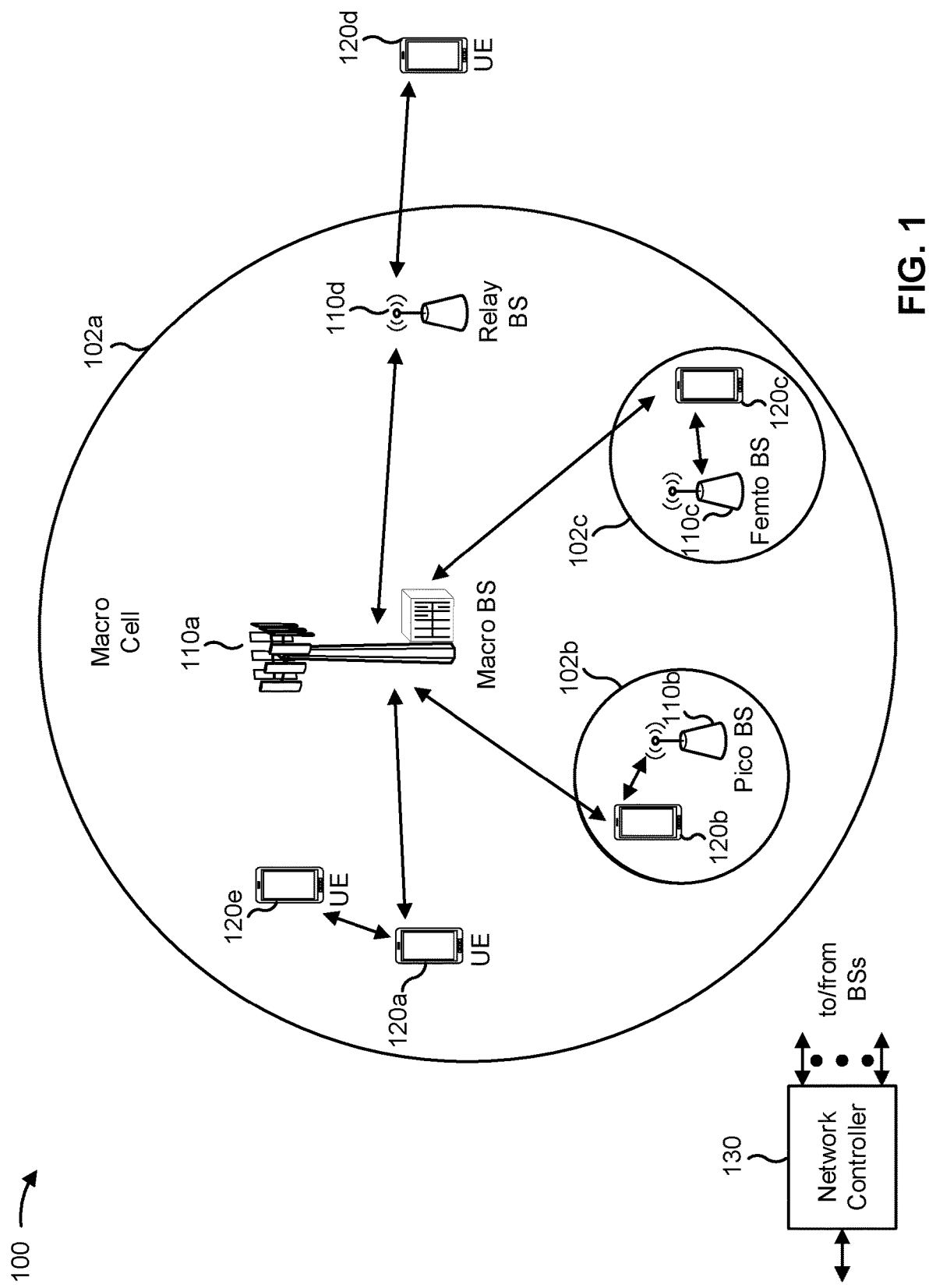
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110*d* may communicate with macro BS 110*a* and a UE 120*d* in order to facilitate communication between BS 110*a* and UE 120*d*. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, directly or indirectly, via a wireless or wireline backhaul.

UEs 120 (e.g., 120*a*, 120*b*, 120*c*) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
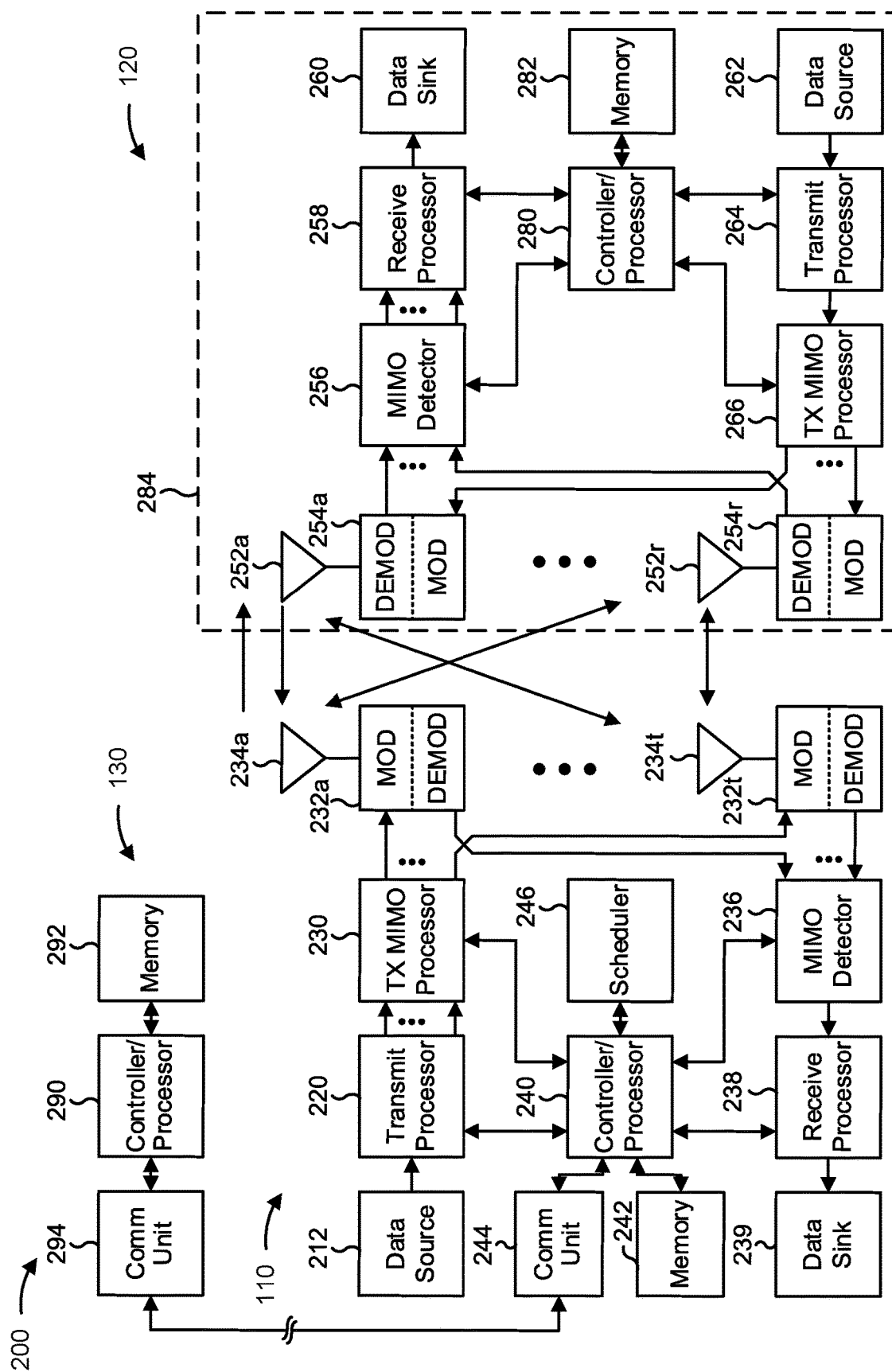
FIG. 2 is a diagram illustrating an example of a base station in communication with a UE in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234*a* through 234*t*, and UE 120 may be equipped with R antennas 252*a* through 252*r*, where in general T≥1 and R≥1.

At base station 110, a transmit processor 220 may receive data from a data source 212 for one or more UEs, select one or more modulation and coding schemes (MCSs) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 120, antennas 252*a* through 252*r* may receive the downlink signals from base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234*a* through 234*t* and/or antennas 252*a* through 252*r*) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r* (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein (for example, as described with reference to FIGS. 3-8).

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein (for example, as described with reference to FIGS. 3-8).

Controller/processor 240 of base station 110, controller/processor 280 of UE 120, and/or any other component(s) of FIG. 2 may perform one or more techniques associated with OAM mode determination for an OAM multiplexing communication, as described in more detail elsewhere herein. For example, controller/processor 240 of base station 110, controller/processor 280 of UE 120, and/or any other component(s) of FIG. 2 may perform or direct operations of, for example, process 700 of FIG. 7, process 800 of FIG. 8, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7, process 800 of FIG. 8, and/or other processes as described herein. In some aspects, executing instructions may include running the instructions, converting the instructions, compiling the instructions, and/or interpreting the instructions, among other examples.

In some aspects, a transmitter (e.g., UE 120 or BS 110) may include means for receiving, from a receiver associated with an orbital angular momentum (OAM) multiplexing based communication, feedback; means for determining a selected OAM mode for communication with the receiver based at least in part on the feedback; means for transmitting the OAM multiplexing based communication to the receiver based at least in part on the selected OAM mode; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

In some aspects, a receiver (e.g., UE 120 or BS 110) may include means for determining feedback associated with an OAM multiplexing based communication; means for transmitting the feedback to a transmitter of the OAM multiplexing based communication; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
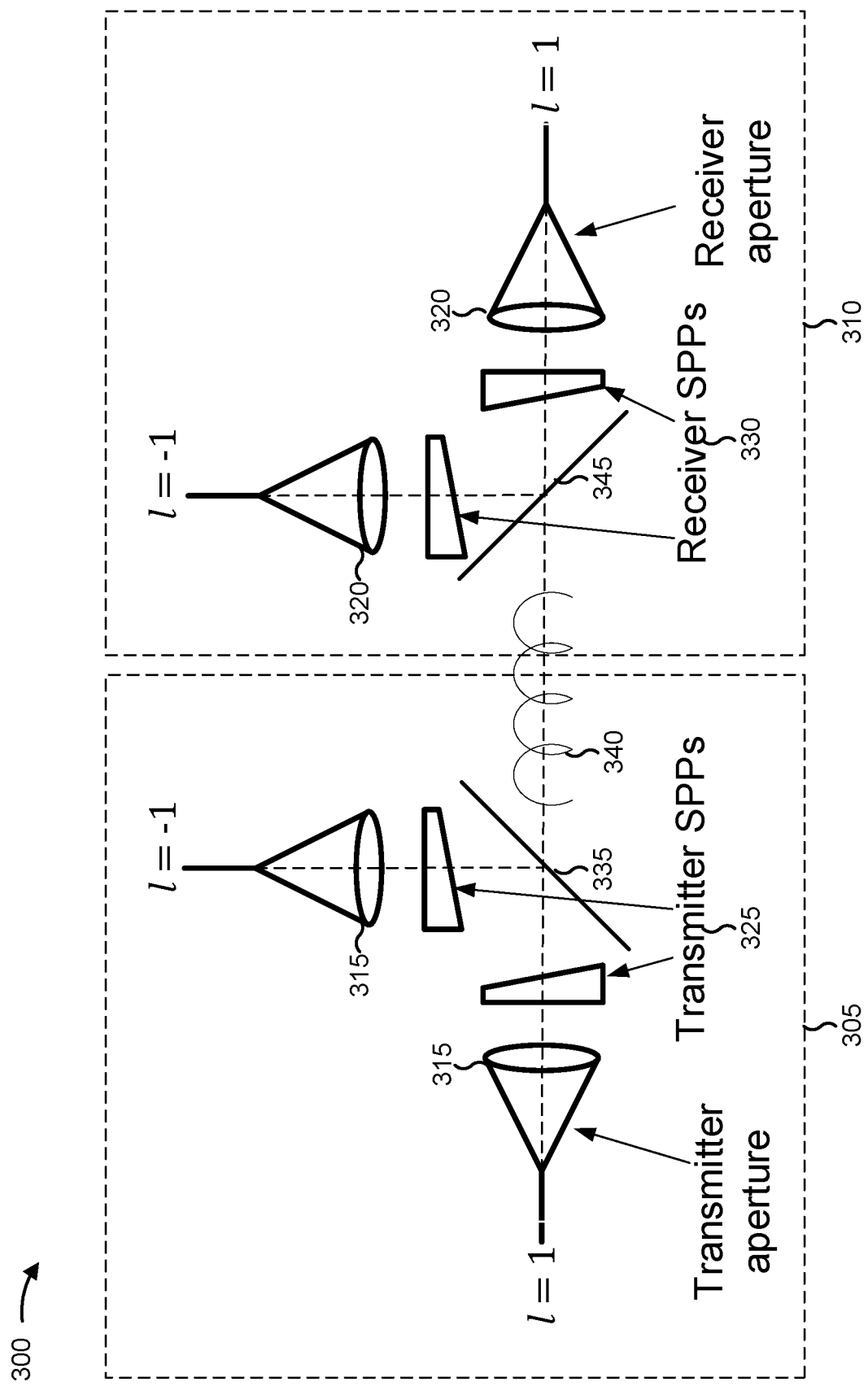
FIG. 3 is a diagram illustrating an example of OAM communication components of a transmitter and a receiver, in accordance with the present disclosure.

FIG. 3 is a diagram illustrating an example 300 of OAM communication components of a transmitter and a receiver, in accordance with the present disclosure. The transmitter may include a wireless communication device, such as UE 120 or BS 110. The receiver may include a wireless communication device, such as UE 120 or BS 110. The transmitter may transmit a communication using OAM multiplexing, such as a communication in which multiple layers are multiplexed using OAM multiplexing, with one or more layers per OAM mode.

Communication components of the transmitter are enclosed by the box 305, and components of the receiver are enclosed by the box 310. As shown, the transmitter may include transmitter apertures 315-1 and 315-2. OAM modes may be used to multiplex multiple layers of a communication in a single transmission. For example, different layers of a communication may be mapped to different OAM modes. A transmitter of an OAM multiplexing communication radiates multiple coaxially propagating, spatially-overlapping waves (with OAM mode l= . . . , −2, −1, 0, 1, 2, . . . ), each carrying a data stream through a set of transmitter apertures 315. An electromagnetic (EM) wave with a helical transverse phase of the form exp(iφl) carries an OAM mode waveform, where φ is the azimuthal angle and l is an unbounded integer (referred as an OAM order). Traditional EM beams (such as Gaussian beams) are OAM beams with l=0. The EM wave may be an optical beam or another form of EM wave.

Here, the transmitter includes two transmitter apertures 315, and the receiver includes two receiver apertures 320. Therefore, the transmitter may be capable of transmitting an OAM multiplexing communication using two OAM modes, and the receiver may be capable of receiving an OAM multiplexing communication using two OAM modes. Transmitter aperture 315 and receiver aperture 320 are described in more detail in connection with FIG. 4.

As shown, the transmitter includes a set of spiral phase plates (SPPs) 325 and the receiver includes a set of SPPs 330. An SPP in an optical component comprising spiral or helical phase steps. An SPP may modify the angular momentum of waves transmitted via the SPP, which enables OAM multiplexing of multiple layers (transmitted by respective transmitter apertures 315) and demultiplexing of the multiple layers before reception by respective receiver apertures 320. For example, an SPP 325 may modulate a waveform for OAM multiplexing and an SPP 330 may demodulate the waveform for OAM multiplexing. In some aspects, a transmit beam splitter 335 may combine respective waves associated with respective OAM modes from transmitter aperture 315 into a combined beam 340 that is transmitted via a channel, and a receive beam splitter 345 may split the respective waves (to the degree possible at the receive beam splitter 345) for reception at receiver apertures 320. Theoretically, the waves of the OAM modes can be orthogonally received at the same radio resource (e.g., the same time-frequency domain resource), and thus using OAM multiplexing can greatly improve communication spectrum efficiency. In practice, due to non-ideal factors (like transmitter/receiver axial or position placement error), these waves may induce some degree of crosstalk among OAM modes at the receiver. Some techniques and apparatuses described herein provide for communication between the transmitter and the receiver so that OAM modes can be selected to improve the performance of OAM multiplexing based communication.

As indicated above, FIG. 3 is provided as an example. Other examples may differ from what is described with regard to FIG. 3.

Figure 4:
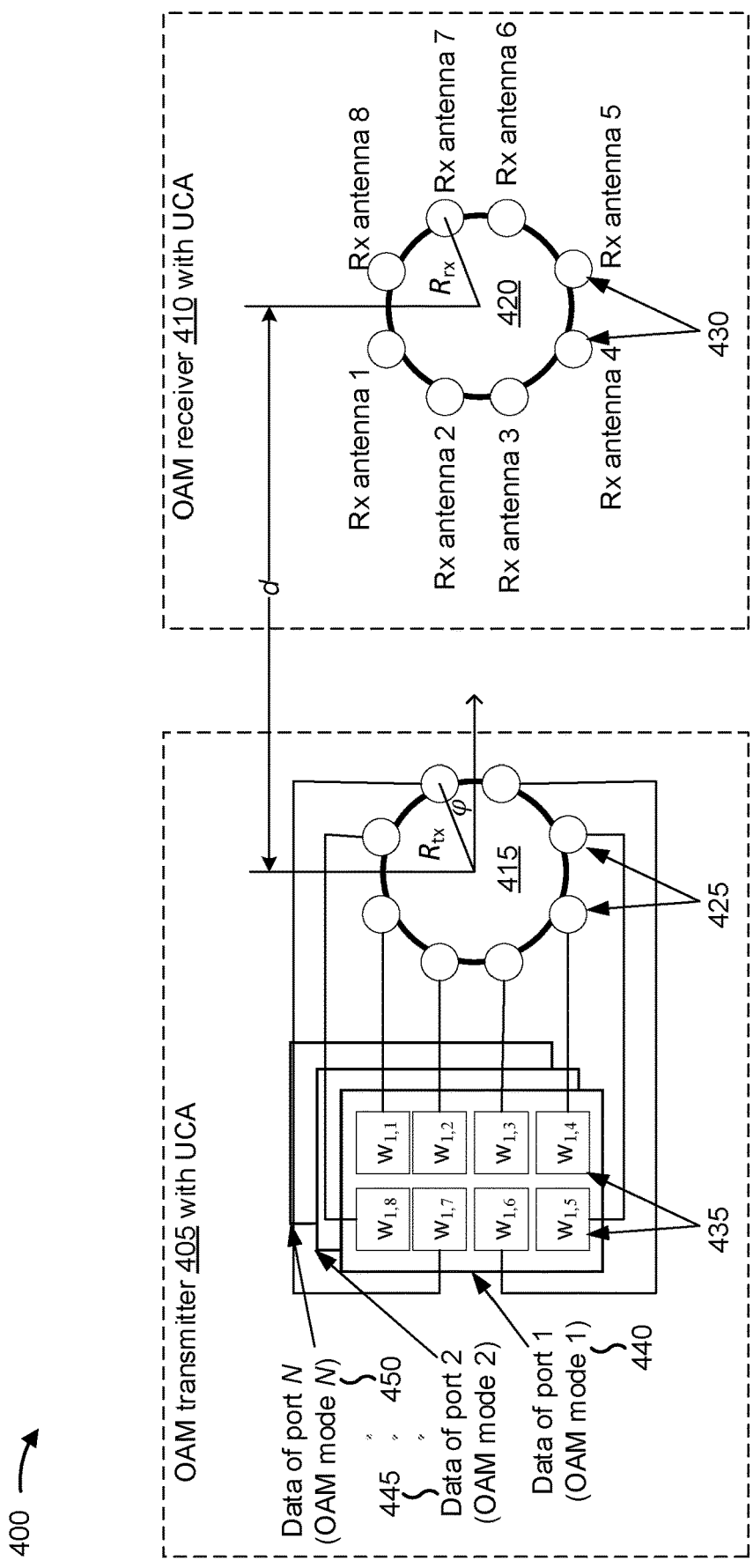
FIG. 4 is a diagram illustrating an example of a transmitter and a receiver with uniform circular array (UCA) antennas, in accordance with the present disclosure.

FIG. 4 is a diagram illustrating an example 400 of a transmitter 405 and a receiver 410 with uniform circular array (UCA) antennas, in accordance with the present disclosure. The UCA antenna 415 of transmitter 405 may comprise an aperture, such as one of transmitter apertures 315. The UCA antenna 420 of receiver 410 may comprise an aperture, such as one of receiver apertures 320. The UCA antenna 415 may comprise a plurality of transmit antennas 425, of which two are indicated by reference number 425. The UCA antenna 420 may comprise a plurality of receive (Rx) antennas, of which two are indicated by reference number 430. The transmit antennas 425 may be evenly spaced (e.g., substantially equidistant from a center of UCA antenna 415 and/or at substantially equal radial spacing relative to each other). An angular displacement of a transmit antenna 425 relative to an axis is indicated by $\varphi$.

Beamforming weights are generally indicated by reference numbers 435, and are represented by $w_1 = [w_{1,1}, w_{1,2}, \ldots, w_{1,8}]^T$. By multiplying the respective beamforming weights onto a signal for each transmit antenna 425, a signal port 440/445/450 can be generated. A signal port 440 may be used for a first layer of a communication, a signal port 445 may be used for a second layer of a communication, and so on, up to an Nth layer of a communication. If the weight of each transmit antenna 425 is equal to $\exp(i\varphi l)$, where $\varphi$ is the angle of the transmit antenna 425 in the circle and $l$ is an OAM mode index, then a beamformed port is equivalent to OAM mode $l$. By using different beamforming weights $\exp(i\varphi l')$, where $l' \neq l$, multiple OAM modes are generated. For example, using N values of $l$, N different OAM modes can be multiplexed.

The UCA antenna 420 has a similar structure to that of the UCA antenna 425. For example, the receive antennas 430 may be evenly spaced (e.g., substantially equidistant from a center of UCA antenna 420 and/or at substantially equal radial spacing relative to each other). The UCA antenna 420 may receive an OAM multiplexing based communication from the UCA antenna 415 based at least in part on a channel matrix H. For example, the channel matrix from each transmit antenna 425 to each receive antenna 430 may be denoted as H. For the beamformed channel matrix $\tilde{H} = H \cdot [w_1, w_2, \ldots, w_L]$ any two columns of R are orthogonal. Thus, all of the beamformed ports ideally have no crosstalk, thus enabling OAM-based communication to realize high-level spatial multiplexing efficiently.

Although the received waveforms with different OAM modes are orthogonal, these waveforms may have different channel gains and/or signal-to-interference-plus-noise ratios (SINRs). For example, channel gains and/or SINRs that would otherwise be equivalent may fluctuate based at least in part on the OAM mode index $l$. In some aspects, a higher frequency ($f_c$) may maintain inter-mode orthogonal multiplexing across a longer distance ($Z_0$) than a lower frequency. However, these channel gains are jointly determined by transmitter parameters, receiver parameters, and channel parameters. Without access to receiver parameters and channel parameters, an OAM communication transmitter, such as the transmitter 405, may not be able to determine suitable OAM modes that are associated with high channel gains. Thus, transmission performance of OAM multiplexing based communications may suffer, thereby decreasing throughput and using computing and communication resources.

Some techniques and apparatuses described herein provide for an OAM communication receiver, such as receiver 410, to provide feedback associated with an OAM multiplexing based communication to an OAM communication transmitter, such as transmitter 405. For example, the feedback may indicate a set of preferred OAM modes of the receiver, corresponding channel gains associated with the set of preferred OAM modes, channel parameters (e.g., pathloss or the like), receiver parameters (e.g., a radius of an aperture of UCA antenna 425), and/or the like. The OAM communication transmitter may determine one or more selected OAM modes based at least in part on the feedback, and may use the one or more selected OAM modes to communicate with the OAM communication receiver. In some aspects, the OAM communication transmitter may transmit reference signals on one or more OAM modes, such as for determination of the feedback, or on one or more preferred OAM modes for selection of a selected OAM mode from the one or more preferred OAM modes. In this way, the OAM communication transmitter can determine one or more selected OAM modes for communication with an OAM communication receiver based at least in part on feedback from the OAM communication receiver, which improves channel gain of such communications and thereby increases throughput and reliability.

While FIGS. 3 and 4 describe an OAM communication system utilizing UCA antennas, some OAM communication systems utilize antennas of formats other than UCA antennas, such as in conjunction with UCA antennas or instead of UCA antennas. The techniques and apparatuses described herein can be applied for OAM communication systems that do not use UCA antennas.

As indicated above, FIG. 4 is provided as an example. Other examples may differ from what is described with regard to FIG. 4.

Figure 5:
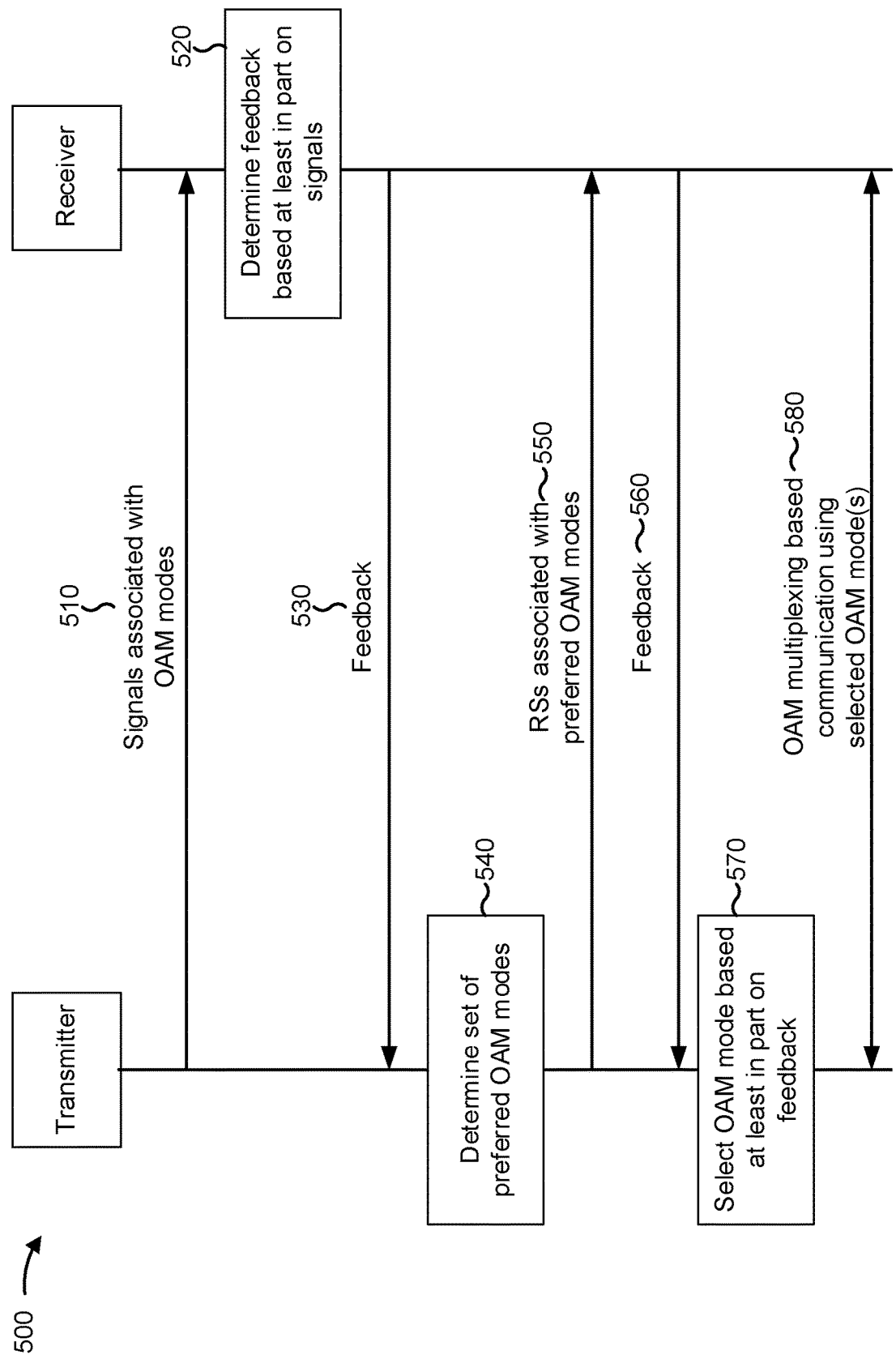
FIG. 5 is a diagram illustrating an example of signaling associated with OAM mode determination for an OAM multiplexing communication, in accordance with the present disclosure.

FIG. 5 is a diagram illustrating an example 500 of signaling associated with OAM mode determination for an OAM multiplexing communication, in accordance with the present disclosure. The operations described with regard to example 500 may be performed by a transmitter (e.g., UE 120, BS 110, the transmitter of FIG. 3, the transmitter 405 of FIG. 4, and/or the like) and a receiver (e.g., UE 120, BS 110, the receiver of FIG. 3, the receiver 410 of FIG. 4, and/or the like).

As shown in FIG. 5, and by reference number 510, in some aspects, the transmitter may transmit one or more signals associated with a set of OAM modes to the receiver. In some aspects, the one or more signals may comprise a set of reference signals. For example, the transmitter may transmit the set of reference signals via respective waveforms of the set of OAM modes (e.g., one reference signal per OAM mode, multiple reference signals per OAM mode, and/or the like). In some aspects, the one or more signals may include a signal other than a reference signal, such as a data communication or a control communication.

In some aspects, a set of reference signals may be transmitted on a same radio resource (such as a same time-frequency resource). For example, since the set of reference signals are associated with different OAM modes, the set of reference signals can be transmitted on the same radio resource while preserving some degree of orthogonality to each other. Using the same time-frequency resource may reduce overhead and resource usage. In some aspects, the set of reference signals may be transmitted on different radio resources. Transmitting the set of reference signals on different radio resources may reduce mutual interference of the set of reference signals if the transmitter and/or the receiver introduce some interference, for example, due to imperfect calibration.

In some aspects, a set of reference signals may be based at least in part on an orthogonal cover code (OCC). For example, the transmitter may apply an OCC of [1 1, 1 −1] to a first pair of reference signals associated with a first OAM mode and a second pair of reference signals associated with a second OAM mode. For example, the OCC portion of [1 1] may be applied to a first and second reference signal of the first pair of reference signals, and the OCC portion of [1 −1] may be applied to a first and second reference signal of the second pair of reference signals. In this case, the first reference signal of the first pair and the first reference signal of the second pair may be summed and transmitted in a first radio resource with respective combining weights of 1 and 1, and the second reference signal of the first pair and the second reference signal of the second pair may be summed and transmitted in a second radio resource with respective combining weights of 1 and −1. Thus, diversity and robustness against interference of the set of reference signals are improved.

As shown by reference number 520, in some aspects, the receiver may determine feedback based at least in part on the signals received from the transmitter. For example, the receiver may perform a measurement on the signals (e.g., the set of reference signals or another signal). The receiver may determine a set of channel gain and/or SINR values corresponding to the set of OAM modes. In some aspects, the receiver may determine a set of preferred OAM modes, such as a set of one or more OAM modes associated with a best channel gain and/or SINR value, a higher channel gain and/or SINR than other OAM modes, a channel gain and/or SINR that satisfies a threshold, and/or the like. If two OAM modes have equal channel gain and/or SINR, then the receiver may select one of the two OAM modes, for example, based at least in part on which OAM mode of the two OAM modes has a mode index with a lower absolute value. In some aspects, the receiver may determine an inter-mode mutual interference matrix based at least in part on the signals. For example, an inter-mode mutual interference matrix may indicate mutual interference between sets of modes, of the set of modes on which the signals are transmitted. In some aspects, the inter-mode mutual interference matrix may be represented as $\hat{H}^H \hat{H}$ (e.g., the Hermitian of H multiplied by $\hat{H}$) using the notation defined in connection with FIGS. 3 and 4. If the receiver determines an inter-mode mutual interference matrix, then the receiver may determine the one or more preferred OAM modes based at least in part on the inter-mode mutual interference matrix and the channel gains and/or SINRs. For example, the receiver may calculate the SINR of each OAM mode based on inter-mode mutual interference matrix, and then determine the one or more preferred OAM modes which have the largest SINR values.

In some aspects, the transmitter may transmit reference signals at different polarizations. For example, each OAM mode may have multiple (e.g., two) polarizations. Two data streams can be transmitted at each polarization. If the polarization directions are identical between a Tx aperture and an Rx aperture, there may be no mutual interference between these two data streams. Otherwise, these two data streams may suffer from some amount of inter-polarization interference. The transmitter may transmit reference signals at each polarization of each OAM mode. The receiver may select one or more OAM modes, and may report an SINR or channel gain for each polarization of the selected one or more OAM modes.

In some aspects, the receiver may determine a channel parameter based at least in part on the signals. A channel parameter refers to a measurement or other information determined regarding a channel via which the signals 510 propagate. For example, the channel parameter may include a pathloss or another parameter. In some aspects, the receiver may determine a distance d from the transmitter based at least in part on the pathloss. For example, the receiver may determine the distance based at least in part on the pathloss, signal propagation delay, an expected receive power of a reference signal, and/or the like. The distance d can be considered a channel parameter. The receiver may provide an indication of the channel parameter in feedback to the transmitter, as described in more detail below.

In some aspects, the receiver may determine a receiver parameter. "Receiver parameter" refers to a measurement or other information regarding the receiver. One example of a receiver parameter includes an aperture radius $R_{rx}$ of the receiver (e.g., a distance from a midpoint of a UCA antenna or aperture to a receiver antenna of the UCA antenna or aperture). The receiver may provide an indication of the receiver parameter in feedback to the transmitter, as described in more detail below. In some aspects, the receiver may report a capability to support one polarization or two polarizations. In some cases, such as for complexity reduction, the capability may be different among different OAM modes. In this case, the reported capability may be per OAM mode.

As shown, the receiver may transmit feedback 530 to the transmitter. The feedback may include information indicating a set of preferred OAM modes, one or more channel parameters (e.g., a distance d, a pathloss, one or more channel gains, one or more SINRs, and/or the like), one or more receiver parameters (e.g., an aperture radius of the receiver and/or the like), a combination thereof, and/or the like. In some aspects, the receiver may transmit the feedback 530 based at least in part on receiving the signals 510. In some aspects, the receiver may transmit the feedback 530 based at least in part on a request from the transmitter. In some aspects, the receiver may transmit the feedback 530 periodically.

As shown by reference number 540, in some aspects, the transmitter may determine a set of preferred OAM modes based at least in part on the feedback 530. For example, the feedback 530 may indicate the set of preferred OAM modes as selected by the receiver. As another example, the transmitter may determine the set of preferred OAM modes based at least in part on one or more channel parameters and/or one or more receiver parameters indicated by the feedback 530. For a more detailed description of selecting a set of preferred OAM modes, refer to the description of FIG. 6.

As shown, in some aspects, the transmitter may transmit a set of reference signals 550 associated with a set of preferred OAM modes, such as a set of preferred OAM modes selected by the receiver and indicated in the feedback 530, or a set of preferred OAM modes determined by the transmitter based at least in part on the feedback. The set of reference signals may include one or more reference signals as defined in connection with reference number 510. By transmitting the set of reference signals on the set of preferred OAM modes, the transmitter may conserve signaling and processing resources that might otherwise be used to transmit the set of reference signals on all OAM modes indiscriminately and/or repeatedly.

In some aspects, the transmitter may transmit a first set of reference signals 510 (e.g., on a set of OAM modes) and a second set of reference signals 550 (e.g., on a set of preferred OAM modes selected from the set of OAM modes). The second set of reference signals may enable the receiver to improve the accuracy of channel gain determination and/or inter-mode mutual interference matrix (e.g., $\tilde{H}^H \tilde{H}$) determination by the receiver in the case of non-ideal factors such as imperfect implementation of the transmitter and/or the receiver, changing channel conditions, and/or the like.

As shown, the receiver may provide feedback 560 (e.g., second feedback) based at least in part on the reference signals 550. The feedback 560 may include part of or all of the information described with regard to the feedback 530. For example, the feedback 560 may indicate one or more preferred OAM modes selected from one or more OAM modes on which the reference signals 550 were transmitted, channel parameters associated with the one or more OAM modes, receiver parameters associated with the one or more OAM modes, and/or the like.

As shown by reference number 570, the transmitter may select one or more OAM modes based at least in part on the feedback, such as the feedback 530 and/or the feedback 560. In some aspects, the transmitter may select the one or more OAM modes based at least in part on the one or more OAM modes being associated with one or more highest channel gain and/or SINR values, based at least in part on the one or more OAM modes being associated with channel gain and/or SINR values that satisfy a threshold, based at least in part on the one or more OAM modes providing a highest expected channel gain and/or SINR, and/or based at least in part on one or more other criteria.

As shown by reference number 580, the transmitter may transmit an OAM multiplexing based communication using the one or more selected OAM modes. For example, the transmitter may configure one or more transmitter apertures (e.g., transmitter aperture 315 and/or the like) based at least in part on the one or more selected OAM modes, and may transmit an OAM multiplexing based communication including one or more layers corresponding to the one or more selected OAM modes. In some aspects, the transmitter may transmit an indication of the one or more selected OAM modes to the receiver. In this case, the receiver may configure one or more receiver apertures (e.g., receiver aperture 320 and/or the like) based at least in part on the one or more selected OAM modes. Thus, the receiver informs the transmitter, via feedback regarding one or more signals, of channel parameters, receiver parameters, and/or preferred OAM modes for OAM multiplexing based communication. The transmitter can select one or more selected OAM modes for the OAM multiplexing based communication based at least in part on the feedback and/or one or more other factors. In this way, channel gain and/or SINR and thus throughput are improved in OAM multiplexing based communication systems.

As indicated above, FIG. 5 is provided as an example. Other examples may differ from what is described with regard to FIG. 5.

Figure 6:
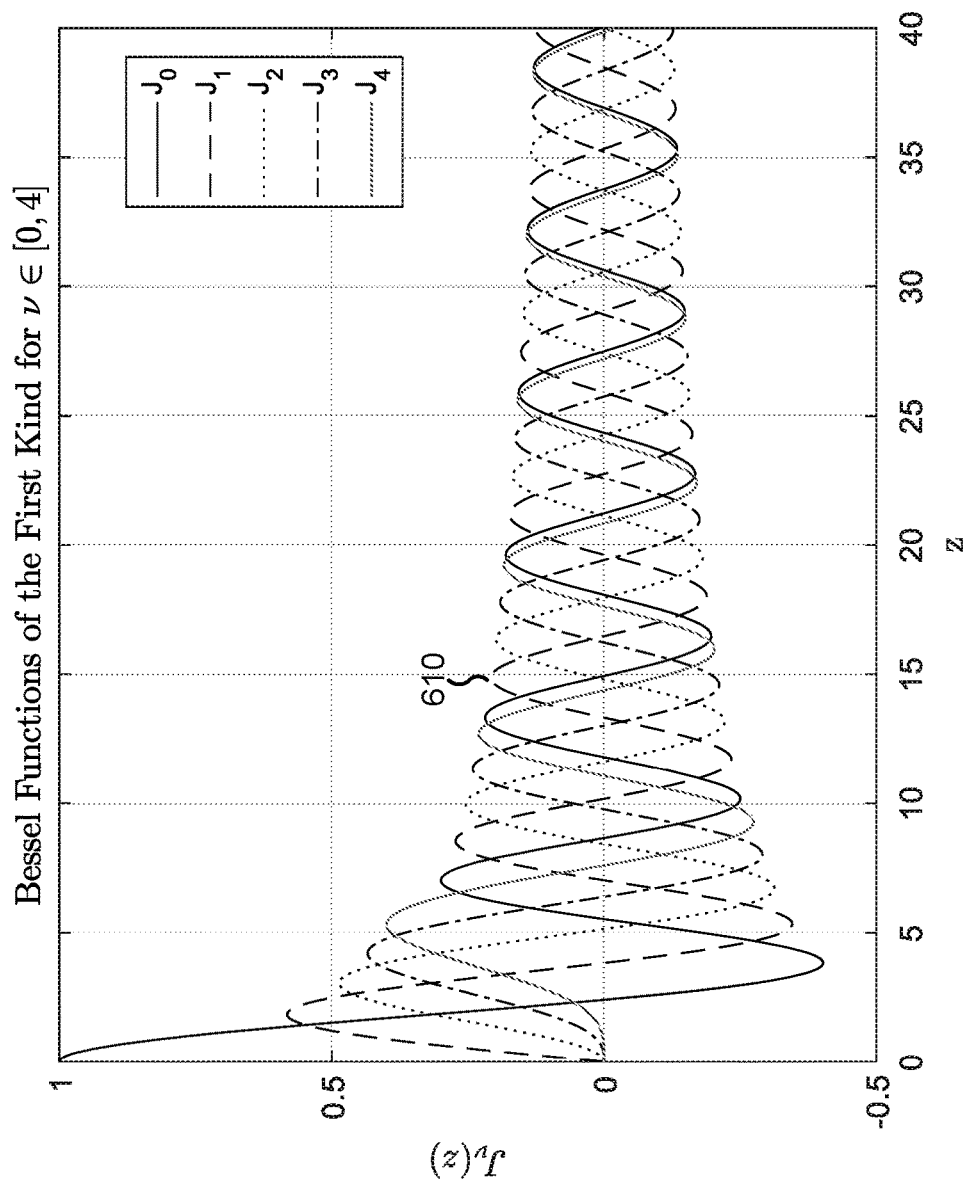
FIG. 6 is a diagram illustrating an example of a Bessel function output that may be used in connection with selection of an OAM mode by a transmitter, in accordance with the present disclosure.

FIG. 6 is a diagram illustrating an example 600 of a Bessel function output that may be used in connection with selection of an OAM mode by a transmitter, in accordance with the present disclosure. A transmitter (e.g., UE 120, BS 110, the transmitter of FIG. 3, the transmitter 405, the transmitter of FIG. 5, and/or the like) may perform the selection of an OAM mode based at least in part on feedback from a receiver (e.g., UE 120, BS 110, the receiver of FIG. 3, the receiver 410, the receiver of FIG. 5, and/or the like) and/or based at least in part on one or more transmitter parameters. "Transmitter parameter" refers to a measurement or other information regarding the transmitter. Examples of transmitter parameters include an aperture radius $R_{tx}$ of the transmitter (e.g., a distance from a midpoint of a UCA antenna or aperture to a transmitter antenna of the UCA antenna or aperture) and a wavelength λ associated with a UCA antenna or aperture of the transmitter.

If the transmitter is implemented with uniform circular array (UCA) antennas, such as those described in connection with FIGS. 3 and 4, the received signal of OAM mode $l_i$ at the receiver can be calculated to generate a factor $$J_{l_i}\left(\frac{2\pi}{\lambda} \frac{R_{rx} R_{tx}}{\sqrt{R_{rx}^2 + d^2}}\right).$$

The factor $J_{l_i}$ may be proportionate to a channel gain of OAM mode $l_i$, where $J_l(\bullet)$ denotes the lth order Bessel function of the first kind. Thus, if the transmitter receives a receiver parameter $R_{rx}$ (e.g., the radius of the receiver aperture) and a channel parameter indicating a propagation path distance d, the transmitter may determine the value of $$J_{l_i}\left(\frac{2\pi}{\lambda} \frac{R_{rx} R_{tx}}{\sqrt{R_{rx}^2 + d^2}}\right),$$

based on transmitter parameters including the wavelength λ and the radius of the transmitter aperture $R_{tx}$. Example Bessel function values are shown in example 600. From example 600, the transmitter can determine, for a given value z (where z represents a set of given values of $R_{rx}$, $R_{tx}$, d, λ, the function value $J_v(z)$ for a certain parameter v (i.e. for a certain OAM mode). Finally, the transmitter selects the OAM modes whose $$J_{l_i}\left(\frac{2\pi}{\lambda} \frac{R_{rx} R_{tx}}{\sqrt{R_{rx}^2 + d^2}}\right)$$

values are the largest, since $J_{l_i}$ is proportionate to the channel gain of the corresponding OAM mode given the receiver parameters, transmitter parameters, and/or channel parameters that comprise z. For example, at a value of z=15, the transmitter may select an OAM mode corresponding to the Bessel function shown by reference number 610, since the selected OAM mode is predicted to have a highest channel gain at the receiver based at least in part on the receiver parameters, channel parameters, and transmitter parameters used to determine z. It can be seen that, if the propagation path distance d is much larger than the Rx aperture (i.e., d>>$R_{rx}$), then $$J_{l_i}\left(\frac{2\pi}{\lambda}\frac{R_{rx}R_{tx}}{\sqrt{R_{rx}^2+d^2}}\right) \approx J_{l_i}\left(\frac{2\pi}{\lambda}\frac{R_{rx}R_{tx}}{d}\right).$$

The above technique for selecting an OAM mode can be applied for the selection of preferred OAM modes for further reference signaling, as described with regard to reference number 540, and/or for selection of a selected OAM mode for OAM multiplexing based communication, as described with regard to reference number 570. In some aspects, the above technique may be combined with other techniques for selecting an OAM mode, or another technique may be used in place of the above technique for selecting an OAM mode.

As indicated above, FIG. 6 is provided as one or more examples. Other examples are possible and may differ from what is described with regard to FIG. 6.

Figure 7:
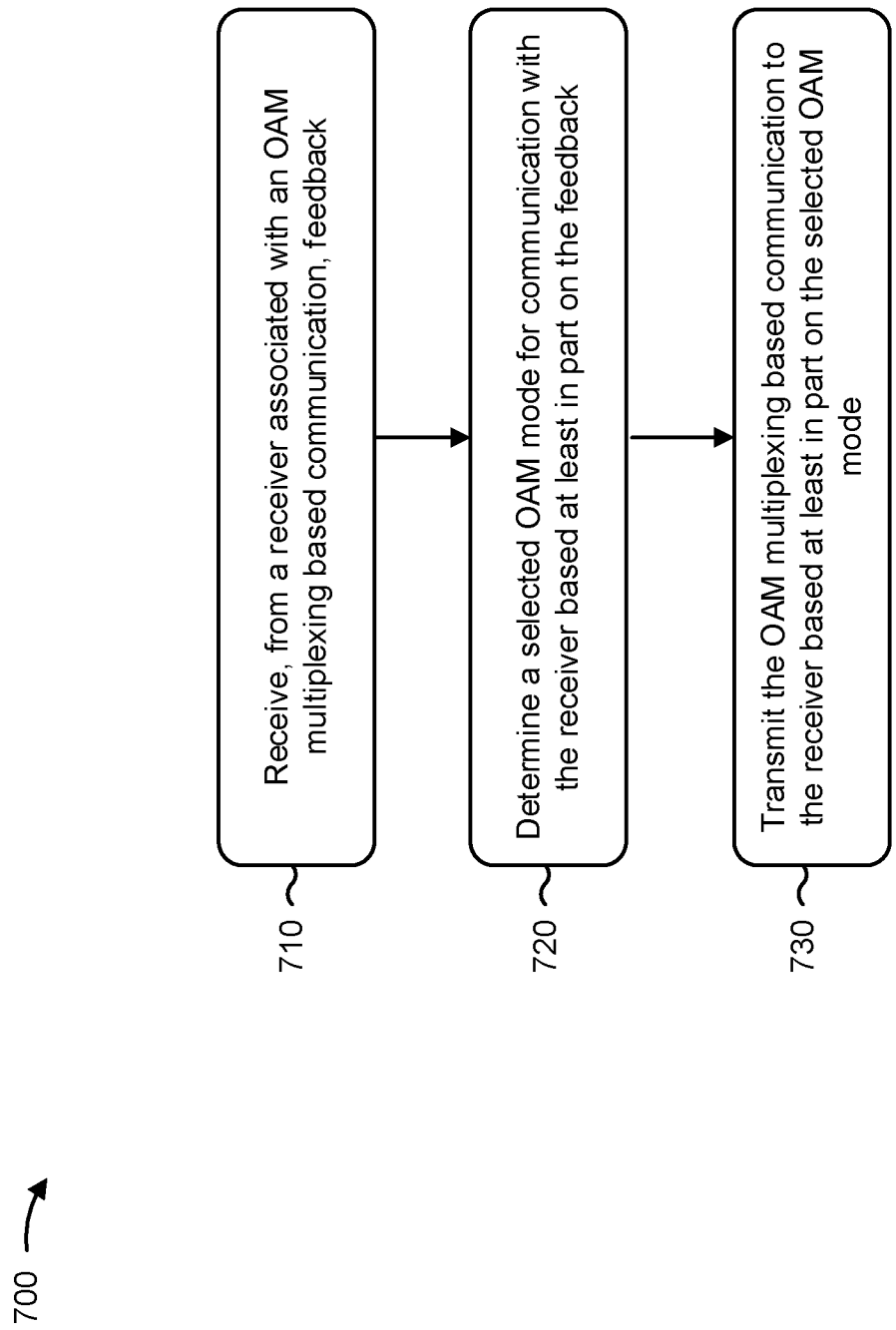
FIGS. 7-8 are diagrams illustrating example processes associated with OAM mode determination for an OAM multiplexing communication, in accordance with the present disclosure.

FIG. 7 is a diagram illustrating an example process 700 performed, for example, by a transmitter, in accordance with the present disclosure. Example process 700 is an example where the transmitter (e.g., UE 120, BS 110, the transmitter of FIG. 3, the transmitter 405 of FIG. 4, the transmitter of FIG. 5, and/or the like) performs operations associated with mode determination for an OAM communication system.

As shown in FIG. 7, in some aspects, process 700 may include receiving, from a receiver associated with an OAM multiplexing based communication, feedback (block 710). For example, the transmitter may receive (e.g., using antenna 234, DEMOD 232, MIMO detector 236, receive processor 238, controller/processor 240, receiver aperture 320, UCA antenna 415, UCA antenna 420, and/or the like), from a receiver associated with an OAM multiplexing based communication, feedback.

As further shown in FIG. 7, in some aspects, process 700 may include determining a selected OAM mode for communication with the receiver based at least in part on the feedback (block 720). For example, the transmitter (e.g., using antenna 234, DEMOD 232, MIMO detector 236, receive processor 238, controller/processor 240, receiver aperture 320, UCA antenna 415, UCA antenna 420, and/or the like) may determine a selected OAM mode for communication with the receiver based at least in part on the feedback, as described above.

As further shown in FIG. 7, in some aspects, process 700 may include transmitting the OAM multiplexing based communication to the receiver based at least in part on the selected OAM mode (block 730). For example, the transmitter (e.g., using antenna 234, DEMOD 232, MIMO detector 236, receive processor 238, controller/processor 240, transmitter aperture 315, UCA antenna 415, UCA antenna 420, and/or the like) may transmit the OAM multiplexing based communication to the receiver based at least in part on the selected OAM mode, as described above.

Process 700 may include additional aspects, such as any single aspect or any combination of aspects described below and/or in connection with one or more other processes described elsewhere herein.

In a first aspect, the process 700 comprises transmitting a set of reference signals associated with a set of OAM modes including the selected OAM mode, and receiving the feedback comprises receiving, from the receiver, feedback based at least in part on the set of reference signals.

In a second aspect, alone or in combination with the first aspect, the set of reference signals are transmitted using a same radio resource.

In a third aspect, alone or in combination with one or more of the first and second aspects, the set of reference signals use a set of pre-configured symbols.

In a fourth aspect, alone or in combination with one or more of the first through third aspects, a first reference signal of the set of reference signals is transmitted using a first radio resource, and a second reference signal of the set of reference signals is transmitted using a second radio resource, different from the first radio resource.

In a fifth aspect, alone or in combination with one or more of the first through fourth aspects, the set of reference signals comprise a first pair of reference signals associated with a first OAM mode of the set of OAM modes and a second pair of reference signals associated with a second OAM mode of the set of OAM modes, and the first pair of reference signals and the second pair of reference signals are transmitted using orthogonal cover coding.

In a sixth aspect, alone or in combination with one or more of the first through fifth aspects, each OAM mode, of the set of OAM modes, is associated with at least one reference signal of the set of reference signals.

In a seventh aspect, alone or in combination with one or more of the first through sixth aspects, the feedback indicates a set of channel gain values corresponding to a set of OAM modes.

In an eighth aspect, alone or in combination with one or more of the first through seventh aspects, the feedback indicates a set of preferred OAM modes and a set of channel gain values corresponding to the set of preferred OAM modes, wherein the selected OAM mode is selected from the set of preferred OAM modes In a ninth aspect, alone or in combination with one or more of the first through eighth aspects, the set of preferred OAM modes are associated with highest channel gain values of a set of OAM modes.

In a tenth aspect, alone or in combination with one or more of the first through ninth aspects, the feedback indicates one or more receiver parameters associated with the receiver and one or more channel parameters associated with a set of OAM modes.

In an eleventh aspect, alone or in combination with one or more of the first through tenth aspects, the one or more receiver parameters include a radius of an aperture of the receiver, and the one or more channel parameters include at least one of a propagation path distance associated with a set of reference signals or a pathloss associated with the set of reference signals.

In a twelfth aspect, alone or in combination with one or more of the first through eleventh aspects, process 700 includes determining a set of channel gains for a set of OAM modes based at least in part on the one or more receiver parameters and the one or more channel parameters; and selecting the selected OAM mode based at least in part on the set of channel gains.

In a thirteenth aspect, alone or in combination with one or more of the first through twelfth aspects, the set of channel gains is determined based at least in part on a Bessel function of a first kind, wherein the Bessel function of the first kind receives, as input, the one or more receiver parameters, the one or more channel parameters, and one or more transmitter parameters associated with the transmitter, and wherein the Bessel function of the first kind outputs a factor for determining the set of channel gains.

In a fourteenth aspect, alone or in combination with one or more of the first through thirteenth aspects, process 700 includes transmitting one or more reference signals based on a set of preferred OAM modes; receiving, from the receiver, information indicating one or more preferred OAM modes of the set of preferred OAM modes and one or more corresponding channel gains of the one or more preferred OAM modes; and selecting the selected OAM mode from the one or more preferred OAM modes based at least in part on the one or more corresponding channel gains.

In a fifteenth aspect, alone or in combination with one or more of the first through fourteenth aspects, the set of preferred OAM modes is selected by the transmitter.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
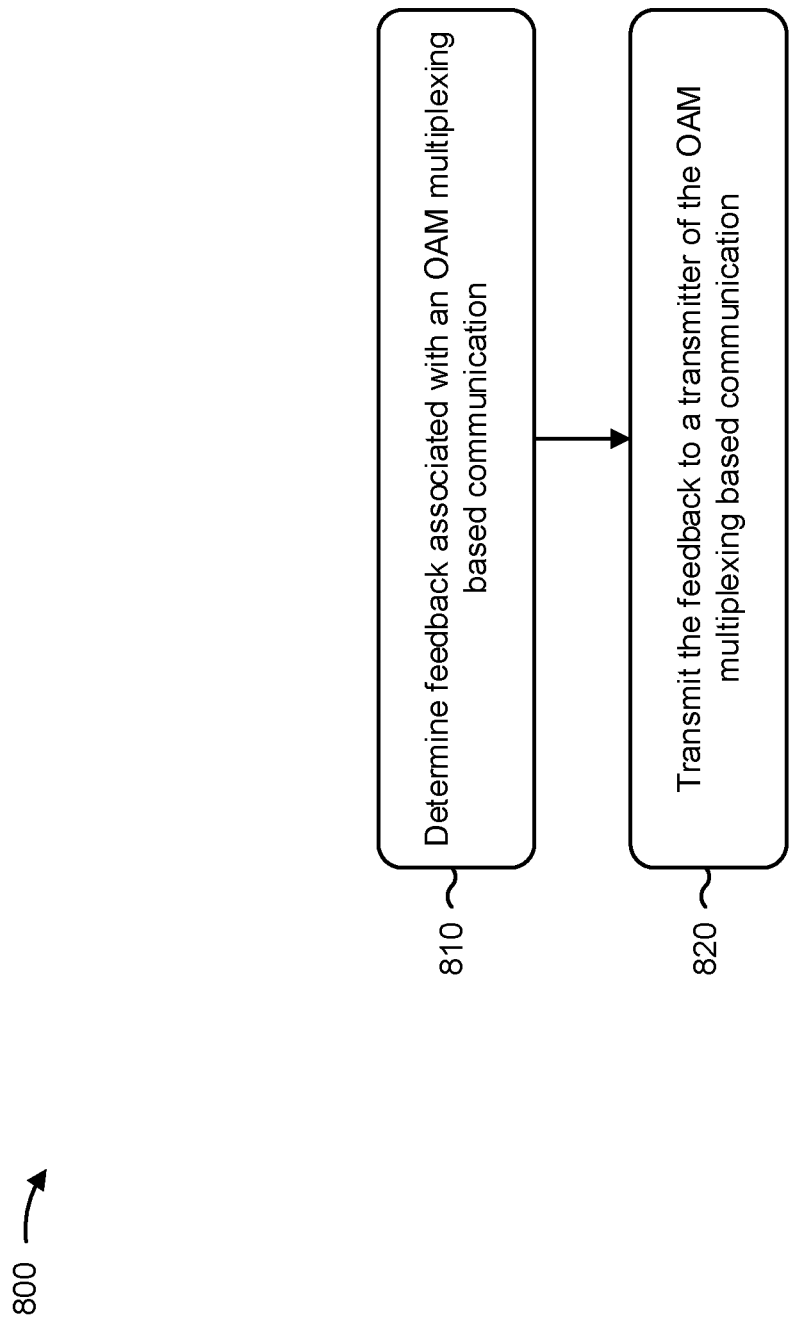

FIG. 8 is a diagram illustrating an example process 800 performed, for example, by a receiver, in accordance with the present disclosure. Example process 800 is an example where the receiver (e.g., UE 120, BS 110, the receiver of FIG. 3, the receiver 410 of FIG. 4, the receiver of FIG. 5, and/or the like) performs operations associated with mode determination for an OAM communication system.

As shown in FIG. 8, in some aspects, process 800 may include determining feedback associated with an OAM multiplexing based communication (block 810). For example, the receiver (e.g., using antenna 234, DEMOD 232, MIMO detector 236, receive processor 238, controller/processor 240, receiver aperture 320, UCA antenna 415, UCA antenna 420, and/or the like) may determine feedback associated with an OAM multiplexing based communication, as described above.

As further shown in FIG. 8, in some aspects, process 800 may include transmitting the feedback to a transmitter of the OAM multiplexing based communication (block 820). For example, the receiver (e.g., using antenna 234, DEMOD 232, MIMO detector 236, receive processor 238, controller/processor 240, transmitter aperture 315, receiver aperture 320, UCA antenna 415, UCA antenna 420, and/or the like) may transmit the feedback to a transmitter of the OAM multiplexing based communication, as described above.

Process 800 may include additional aspects, such as any single aspect or any combination of aspects described below and/or in connection with one or more other processes described elsewhere herein.

In a first aspect, determining the feedback comprises: receiving a set of reference signals associated with a set of OAM modes, and determining the feedback based at least in part on the set of reference signals.

In a second aspect, alone or in combination with the first aspect, the set of reference signals are received on a same radio resource.

In a third aspect, alone or in combination with one or more of the first and second aspects, the set of reference signals use a set of pre-configured symbols.

In a fourth aspect, alone or in combination with one or more of the first through third aspects, a first reference signal of the set of reference signals is received on a first radio resource, and a second reference signal of the set of reference signals is received on a second radio resource, different from the first radio resource.

In a fifth aspect, alone or in combination with one or more of the first through fourth aspects, the set of reference signals comprise a first pair of reference signals associated with a first OAM mode of the set of OAM modes and a second pair of reference signals associated with a second OAM mode of the set of OAM modes, and the first pair of reference signals and the second pair of reference signals are received based at least in part on orthogonal cover coding.

In a sixth aspect, alone or in combination with one or more of the first through fifth aspects, process 800 includes selecting a set of preferred OAM modes based at least in part on the set of reference signals, wherein the feedback indicates the set of preferred OAM modes and a set of channel gain values corresponding to the set of preferred OAM modes.

In a seventh aspect, alone or in combination with one or more of the first through sixth aspects, the set of preferred OAM modes are associated with highest channel gain values of the set of OAM modes.

In an eighth aspect, alone or in combination with one or more of the first through seventh aspects, based at least in part on two OAM modes having an equal channel gain, a selected OAM mode is selected from the two OAM modes based at least in part on the selected OAM mode having a mode index with a smaller absolute value.

In a ninth aspect, alone or in combination with one or more of the first through eighth aspects, the set of preferred OAM modes are selected based at least in part on an inter-mode mutual interference matrix.

In a tenth aspect, alone or in combination with one or more of the first through ninth aspects, each OAM mode, of the set of OAM modes, is associated with at least one respective reference signal of the set of reference signals.

In an eleventh aspect, alone or in combination with one or more of the first through tenth aspects, process 800 includes receiving the OAM multiplexing based communication based at least in part on a selected OAM mode determined based at least in part on the feedback.

In a twelfth aspect, alone or in combination with one or more of the first through eleventh aspects, the feedback indicates a set of channel gain values corresponding to a set of OAM modes.

In a thirteenth aspect, alone or in combination with one or more of the first through twelfth aspects, the feedback indicates one or more receiver parameters associated with the receiver and one or more channel parameters associated with a set of OAM modes.

In a fourteenth aspect, alone or in combination with one or more of the first through thirteenth aspects, the one or more receiver parameters include a radius of an aperture of the receiver, and the one or more channel parameters include at least one of a propagation path distance associated with a set of reference signals or a pathloss associated with the set of reference signals.

In a fifteenth aspect, alone or in combination with one or more of the first through fourteenth aspects, process 800 includes receiving one or more reference signals on a set of selected OAM modes that are selected based at least in part on the feedback; selecting one or more preferred OAM modes of the set of selected OAM modes and one or more corresponding channel gains of the one or more preferred OAM modes; and transmitting information indicating the one or more preferred OAM modes.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

The following provides an overview of some Aspects of the present disclosure:

Aspect 1: A method of wireless communication performed by a transmitter, comprising: receiving, from a receiver associated with an orbital angular momentum (OAM) multiplexing based communication, feedback; determining a selected OAM mode for communication with the receiver based at least in part on the feedback; and transmitting the OAM multiplexing based communication to the receiver based at least in part on the selected OAM mode.

Aspect 2: The method of Aspect 1, further comprising transmitting a set of reference signals associated with a set of OAM modes including the selected OAM mode, wherein receiving the feedback comprises: receiving, from the receiver, feedback based at least in part on the set of reference signals.

Aspect 3: The method of Aspect 2, wherein the set of reference signals are transmitted using a same radio resource.

Aspect 4: The method of Aspect 2, wherein the set of reference signals use a set of pre-configured symbols.

Aspect 5: The method of Aspect 2, wherein a first reference signal of the set of reference signals is transmitted using a first radio resource, and a second reference signal of the set of reference signals is transmitted using a second radio resource, different from the first radio resource.

Aspect 6: The method of Aspect 2, wherein the set of reference signals comprise a first pair of reference signals associated with a first OAM mode of the set of OAM modes and a second pair of reference signals associated with a second OAM mode of the set of OAM modes, and wherein the first pair of reference signals and the second pair of reference signals are transmitted using orthogonal cover coding.

Aspect 7: The method of Aspect 2, wherein each OAM mode, of the set of OAM modes, is associated with at least one reference signal of the set of reference signals.

Aspect 8: The method of Aspect 1, wherein the feedback indicates a set of channel gain values corresponding to a set of OAM modes.

Aspect 9: The method of Aspect 1, wherein the feedback indicates a set of preferred OAM modes and a set of channel gain values corresponding to the set of preferred OAM modes, wherein the selected OAM mode is selected from the set of preferred OAM modes.

Aspect 10: The method of Aspect 9, wherein the set of preferred OAM modes are associated with highest channel gain values of a set of OAM modes.

Aspect 11: The method of Aspect 1, wherein the feedback indicates one or more receiver parameters associated with the receiver and one or more channel parameters associated with a set of OAM modes.

Aspect 12: The method of Aspect 11, wherein the one or more receiver parameters include a radius of an aperture of the receiver, and the one or more channel parameters include at least one of a propagation path distance associated with a set of reference signals or a pathloss associated with the set of reference signals.

Aspect 13: The method of Aspect 11, further comprising: determining a set of channel gains for a set of OAM modes based at least in part on the one or more receiver parameters and the one or more channel parameters; and selecting the selected OAM mode based at least in part on the set of channel gains.

Aspect 14: The method of Aspect 13, wherein the set of channel gains is determined based at least in part on a Bessel function of a first kind, wherein the Bessel function of the first kind receives, as input, the one or more receiver parameters, the one or more channel parameters, and one or more transmitter parameters associated with the transmitter, and wherein the Bessel function of the first kind outputs a factor for determining the set of channel gains.

Aspect 15: The method of Aspect 13, further comprising: transmitting one or more reference signals based on a set of preferred OAM modes; receiving, from the receiver, information indicating one or more preferred OAM modes of the set of preferred OAM modes and one or more corresponding channel gains of the one or more preferred OAM modes; and selecting the selected OAM mode from the one or more preferred OAM modes based at least in part on the one or more corresponding channel gains.

Aspect 16: The method of Aspect 15, wherein the set of preferred OAM modes is selected by the transmitter.

Aspect 17: A method of wireless communication performed by a receiver, comprising: determining feedback associated with an orbital angular momentum (OAM) multiplexing based communication; and transmitting the feedback to a transmitter of the OAM multiplexing based communication.

Aspect 18: The method of Aspect 17, wherein determining the feedback comprises: receiving a set of reference signals associated with a set of OAM modes; and determining the feedback based at least in part on the set of reference signals.

Aspect 19: The method of Aspect 18, wherein the set of reference signals are received on a same radio resource.

Aspect 20: The method of Aspect 18, wherein the set of reference signals use a set of pre-configured symbols.

Aspect 21: The method of Aspect 18, wherein a first reference signal of the set of reference signals is received on a first radio resource, and a second reference signal of the set of reference signals is received on a second radio resource, different from the first radio resource.

Aspect 22: The method of Aspect 18, wherein the set of reference signals comprise a first pair of reference signals associated with a first OAM mode of the set of OAM modes and a second pair of reference signals associated with a second OAM mode of the set of OAM modes, and wherein the first pair of reference signals and the second pair of reference signals are received based at least in part on orthogonal cover coding.

Aspect 23: The method of Aspect 18, further comprising: selecting a set of preferred OAM modes based at least in part on the set of reference signals, wherein the feedback indicates the set of preferred OAM modes and a set of channel gain values corresponding to the set of preferred OAM modes.

Aspect 24: The method of Aspect 23, wherein the set of preferred OAM modes are associated with highest channel gain values of the set of OAM modes.

Aspect 25: The method of Aspect 24, wherein, based at least in part on two OAM modes having an equal channel gain, a selected OAM mode is selected from the two OAM modes based at least in part on the selected OAM mode having a mode index with a smaller absolute value.

Aspect 26: The method of Aspect 24, wherein the set of preferred OAM modes are selected based at least in part on an inter-mode mutual interference matrix.

Aspect 27: The method of Aspect 18, wherein each OAM mode, of the set of OAM modes, is associated with at least one respective reference signal of the set of reference signals.

Aspect 28: The method of Aspect 18, further comprising: receiving the OAM multiplexing based communication based at least in part on a selected OAM mode determined based at least in part on the feedback.

Aspect 29: The method of Aspect 17, wherein the feedback indicates a set of channel gain values corresponding to a set of OAM modes.

Aspect 30: The method of Aspect 17, wherein the feedback indicates one or more receiver parameters associated with the receiver and one or more channel parameters associated with a set of OAM modes.

Aspect 31: The method of Aspect 30, wherein the one or more receiver parameters include a radius of an aperture of the receiver, and the one or more channel parameters include at least one of a propagation path distance associated with a set of reference signals or a pathloss associated with the set of reference signals.

Aspect 32: The method of Aspect 30, further comprising: receiving one or more reference signals on a set of selected OAM modes that are selected based at least in part on the feedback; selecting one or more preferred OAM modes of the set of selected OAM modes and one or more corresponding channel gains of the one or more preferred OAM modes; and transmitting information indicating the one or more preferred OAM modes.

Aspect 33: An apparatus for wireless communication at a device, comprising a processor; memory coupled with the processor; and instructions stored in the memory and executable by the processor to cause the apparatus to perform the method of one or more of Aspects 1-32.

Aspect 34: A device for wireless communication, comprising a memory and one or more processors coupled to the memory, the one or more processors configured to perform the method of one or more of Aspects 1-32.

Aspect 35: An apparatus for wireless communication, comprising at least one means for performing the method of one or more of Aspects 1-32.

Aspect 36: A non-transitory computer-readable medium storing code for wireless communication, the code comprising instructions executable by a processor to perform the method of one or more of Aspects 1-32.

Aspect 37: A non-transitory computer-readable medium storing a set of instructions for wireless communication, the set of instructions comprising one or more instructions that, when executed by one or more processors of a device, cause the device to perform the method of one or more of Aspects 1-32.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a transmitter, comprising:
a memory; and
one or more processors, coupled to the memory, configured to:
receive, from a receiver associated with an orbital angular momentum (OAM) multiplexing based communication, feedback;
determine a selected OAM mode for communication with the receiver based at least in part on the feedback, wherein the selected OAM mode is associated with one or more values that satisfy a threshold; and transmit the OAM multiplexing based communication to the receiver based at least in part on the selected OAM mode.

2. The apparatus of claim 1, wherein the one or more processors are further configured to transmit a set of reference signals associated with a set of OAM modes including the selected OAM mode, wherein receiving the feedback comprises:
receive, from the receiver, the feedback based at least in part on the set of reference signals.

3. The apparatus of claim 2, wherein the set of reference signals are transmitted using a same radio resource.

4. The apparatus of claim 2, wherein the set of reference signals use a set of pre-configured symbols.

5. The apparatus of claim 2, wherein a first reference signal of the set of reference signals is transmitted using a first radio resource, and a second reference signal of the set of reference signals is transmitted using a second radio resource, different from the first radio resource.

6. The apparatus of claim 2, wherein the set of reference signals comprise a first pair of reference signals associated with a first OAM mode of the set of OAM modes and a second pair of reference signals associated with a second OAM mode of the set of OAM modes, and wherein the first pair of reference signals and the second pair of reference signals are transmitted using orthogonal cover coding.

7. The apparatus of claim 2, wherein each OAM mode, of the set of OAM modes, is associated with at least one reference signal of the set of reference signals.

8. The apparatus of claim 2, wherein the set of reference signals includes a first reference signal and a second reference signal associated with an OAM mode, wherein the first reference signal and the second reference signal are at different polarizations.

9. The apparatus of claim 1, wherein the feedback indicates a set of channel gain values corresponding to a set of OAM modes.

10. The apparatus of claim 1, wherein the feedback indicates a set of channel gain values or signal to interference plus noise ratio values for each polarization of a preferred OAM mode.

11. The apparatus of claim 1, wherein the feedback indicates a set of preferred OAM modes and a set of channel gain values corresponding to the set of preferred OAM modes, wherein the selected OAM mode is selected from the set of preferred OAM modes.

12. The apparatus of claim 11, wherein the set of preferred OAM modes are associated with highest channel gain or signal to interference plus noise ratio values of a set of OAM modes.

13. The apparatus of claim 1, wherein the feedback indicates one or more receiver parameters associated with the receiver and one or more channel parameters associated with a set of OAM modes.

14. The apparatus of claim 13, wherein the one or more receiver parameters include a radius of an aperture of the receiver, and the one or more channel parameters include at least one of a propagation path distance associated with a set of reference signals or a pathloss associated with the set of reference signals.

15. The apparatus of claim 13, wherein the one or more processors are further configured to:
determine a set of channel gains for the set of OAM modes based at least in part on the one or more receiver parameters and the one or more channel parameters; and
select the selected OAM mode based at least in part on the set of channel gains.

16. The apparatus of claim 15, wherein the set of channel gains is determined based at least in part on a Bessel function of a first kind, wherein the Bessel function of the first kind receives, as input, the one or more receiver parameters, the one or more channel parameters, and one or more transmitter parameters associated with the transmitter, and wherein the Bessel function of the first kind outputs a factor for determining the set of channel gains.

17. The apparatus of claim 15, wherein the one or more processors are further configured to:
transmit one or more reference signals based on a set of preferred OAM modes;
receive, from the receiver, information indicating one or more preferred OAM modes of the set of preferred OAM modes and one or more corresponding channel gains of the one or more preferred OAM modes; and
select the selected OAM mode from the one or more preferred OAM modes based at least in part on the one or more corresponding channel gains.

18. The apparatus of claim 17, wherein the set of preferred OAM modes is selected by the transmitter.

19. The apparatus of claim 1, wherein the one or more values comprise one or more channel gain or signal to interference plus noise ratio values.

20. An apparatus for wireless communication at a receiver, comprising:
a memory; and
one or more processors, coupled to the memory, configured to:
determine feedback associated with an orbital angular momentum (OAM) multiplexing based communication;
transmit the feedback to a transmitter of the OAM multiplexing based communication; and
receive, from the transmitter, a communication based at least in part on a selected OAM mode, wherein the selected OAM mode is associated with one or more values that satisfy a threshold.

21. The apparatus of claim 20, wherein the one or more processors, to determine the feedback, are configured to:
receive a set of reference signals associated with a set of OAM modes; and
determine the feedback based at least in part on the set of reference signals.

22. The apparatus of claim 21, wherein the set of reference signals are received on a same radio resource.

23. The apparatus of claim 21, wherein the set of reference signals use a set of pre-configured symbols.

24. The apparatus of claim 21, wherein a first reference signal of the set of reference signals is received on a first radio resource, and a second reference signal of the set of reference signals is received on a second radio resource, different from the first radio resource.

25. The apparatus of claim 21, wherein the set of reference signals comprise a first pair of reference signals associated with a first OAM mode of the set of OAM modes and a second pair of reference signals associated with a second OAM mode of the set of OAM modes, and wherein the first pair of reference signals and the second pair of reference signals are received based at least in part on orthogonal cover coding.

26. The apparatus of claim 21, wherein the set of reference signals includes a first reference signal and a second reference signal associated with an OAM mode, wherein the first reference signal and the second reference signal are at different polarizations.

27. The apparatus of claim 20, wherein the one or more processors are further configured to:
   transmit information indicating a capability to support a number of polarizations, wherein the capability is per OAM mode.

28. A method of wireless communication performed by a transmitter, comprising:
   receiving, from a receiver associated with an orbital angular momentum (OAM) multiplexing based communication, feedback;
   determining a selected OAM mode for communication with the receiver based at least in part on the feedback, wherein the selected OAM mode is associated with one or more values that satisfy a threshold; and
   transmitting the OAM multiplexing based communication to the receiver based at least in part on the selected OAM mode.

29. The method of claim 28, further comprising transmitting a set of reference signals associated with a set of OAM modes including the selected OAM mode, wherein receiving the feedback comprises:
   receiving, from the receiver, the feedback based at least in part on the set of reference signals.

30. A method of wireless communication performed by a receiver, comprising:
   determining feedback associated with an orbital angular momentum (OAM) multiplexing based communication;
   transmitting the feedback to a transmitter of the OAM multiplexing based communication; and
   receiving, from the transmitter, a communication based at least in part on a selected OAM mode, wherein the selected OAM mode is associated with one or more values that satisfy a threshold.

* * * * *